United States Patent Office 3,151,171
Patented Sept. 29, 1964

3,151,171
PROCESS FOR SEPARATING SECONDARY
FLUOROALCOHOLS
Richard Irving Day, Wilmington, Del., assignor to E. I.
du Pont de Nemours and Company, Wilmington, Del.,
a corporation of Delaware
No Drawing. Filed May 25, 1962, Ser. No. 197,581
3 Claims. (Cl. 260—633)

This invention is directed to a novel process for separating mixtures of primary and secondary fluoro-alcohols.

These mixtures which are separated according to the present invention are obtained in the process of the telomerization of tetrafluoroethylene and methanol according, for example, to the method described in U.S. 2,559,628. The fluoroalcohols constituting the major product of the telomerization process and to which the process of this invention is applicable have the general structure $H(CF_2CF_2)_nCH_2OH$, wherein $n$ is a positive integer within the range of 2 to 10.

These primary alcohols are now known to contain minor portions (usually 5 to 10% by weight) of secondary fluoroalcohols of the general structure

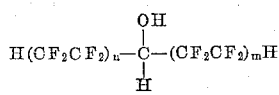

wherein $m$ and $n$ are positive integers from 1 to 5.

The present invention provides a significantly direct and economical process for the separation of the secondary fluoroalcohols from the primary fluoroalcohols and for the recovery of the secondary as well as the primary fluoroalcohols.

The presence of the secondary fluoroalcohols as by-products in the primary fluoroalcohols is not objectionable in some commercial uses developed for these technical telomers, e.g., esterification of the fluoroalcohol. In other uses, there is the need for employing the primary fluoroalcohols in their highest obtainable state of purity, that is, essentially free of secondary fluoroalcohols which impart undesirable properties to certain end-products of potential commercial interest, e.g., oxidation of the primary fluoroalcohol to the acid, the secondary fluoroalcohol producing an undesirable ketone. In addition, there is a growing interest in the use of the secondary fluoroalcohols themselves. They are useful intermediates for conversion to other compounds. They may, for example, be hydrogenated to $\omega,\omega'$-dihydroperfluoroalkyl methanes, oxidized to $\omega$-hydroperfluoroaliphatic carboxylic acids and to the corresponding $\omega,\omega'$-dihydroperfluoroaliphatic ketones. The secondary fluoroalcohols are useful as the operative solvent in absorption refrigeration systems. They also cause a lowering in the surface tension of water and hence may be used as wetting agents.

The primary and secondary fluoroalcohols containing essentially the same number of carbon atoms have close boiling points. This makes it difficult to separate them by the usual distillation processes.

The problem was, therefore, to discover a means whereby secondary fluoroalcohols may be separated and recovered from a mixture with primary fluoroalcohols, such a separation being accomplished without chemically changing the primary fluoroalcohol or destroying the secondary fluoroalcohol.

In U.S. Patent 3,022,356 there is described a process for the preparation of secondary fluoroalcohols with an esterifying agent, in which process the primary fluoroalcohols are preferentially esterified and the secondary fluoroalcohols remain intact and are recovered from the reaction mixture by distillation.

It is the primary objective of the present invention to provide a novel process for separating secondary fluoroalcohols from mixture with primary fluoroalcohols.

Another object of this invention is to provide a process for recovering the secondary fluoroalcohol unchanged and in a substantially pure form.

These and other objects will become apparent in the following description and claims.

It has been unexpectedly found that by treatment of the mixture of fluoroalcohols with a dilute caustic solution below 75° C., the secondary fluoroalcohol is extracted into the aqueous phase as the alkali metal salt and is obtained as the free fluoroalcohol upon neutralization. It was unexpected that the scecondary fluoroalcohol did not decompose. This selective extraction is also unexpected in view of the fact that in the hydrocarbon series a secondary alcohol has less tendency to form a metal salt than the primary isomer. This difference in the behavior of the fluoroalcohols toward dilute aqueous caustic solution makes it possible to separate the secondary from the primary fluoroalcohol and to recover both.

More specifically, the present invention is directed to a novel process for the separation of secondary fluoroalcohols of the formula

where $m$ and $n$ are integers from 1 to 5, from primary fluoroalcohols of the formula $H(CF_2CF_2)_xCH_2OH$, where $x$ is an integer from 2 to 10, by extracting the said secondary fluoroalcohols with an aqueous solution of an alkali metal hydroxide, separating the aqueous layer from the primary alcohol and neutralizing the aqueous layer to liberate the secondary fluoroalcohols.

A further embodiment of the present invention is one in which the primary alcohol product is washed free of electrolytes, and the purified primary fluoroalcohol is recovered.

This invention may be carried out in any suitable extraction apparatus. For relatively small amounts, a separatory funnel may be used, while for large quantities the process may be run continuously in an extraction column. The dilute aqueous caustic solution, which may be either NaOH or KOH, is mixed with the fluoroalocohol mixture. The secondary fluoroalcohol is extracted into the aqueous phase as the alkali metal salt. The aqueous layer is neutralized with a dilute aqueous solution of an acid, such as HCl, $H_2SO_4$ or acetic acid. Carbon dioxide may also be used by bubbling it through the aqueous solution to liberate the free secondary fluoroalcohol.

The oil layer containing the primary fluoroalcohol substantially intact may be washed free of electrolytes, if desired, with water and dried.

The amount of alkali metal hydroxide employed is a stoichiometric quantity or a slight excess which will combine with the secondary fluoroalcohol present. A large excess is unnecessary and wasteful. Dilute aqueous solutions are used in the range of concentration of 0.1 to 5%. Very dilute solutions provide an excessively large amount of water necessitating bulky equipment and are therefore to be avoided.

Concentrations above 5% are not desirable or practical as it becomes increasingly difficult to separate or extract the aqueous alkali metal hydroxide from the fluoroalcohol.

The temperature of the treatment may vary from room temperature to above 75° C. Above 75° C., the secondary fluoroalcohols may be degraded into lower molecular weight products. In the case of higher fluoroalcohols which melt above 75° C., an inert solvent substantially water insoluble may be used to provide a liquid phase system. Solvents which may be employed are, for example, benzene, diethyl ether and chloroform. The fluoroalcohol mixture is dissolved in the organic solvent and then contacted with the dilute aqueous caustic solution as previously described. The secondary fluoroalcohol is extracted into the aqueous layer as the sodium salt and recovered by neutralization. The organic layer containing the primary fluoroalcohol, solvent and some water is fractionated to recover the fluoroalcohol.

Mixtures of primary and secondary fluoroalcohols present in any relative proportion may be separated by this process. Minor amounts as well as preponderant amounts of secondary fluoroalcohols may be effectively separated from primary fluoroalcohols.

The following representative examples illustrate the process of the invention.

*Example 1*

A rotating disc contactor continuous extraction column, similar in basic design to that of Oldshue and Rushton (Chem. Eng. Progress, 48, 297, 1952) was used; the 1½" I.D. column contained 19 stages in a 42" extraction zone. The stage separators were 1½" O.D. and ⅝" I.D., and the ⅝" dia. agitator blade was rotated at 650 r.p.m.

Water at 70° C. was fed into the bottom of the column at a rate of 10.6 in.³/min. which gives a superficial velocity of about 0.5 ft./min. and a 3% solution of sodium hydroxide was fed into the middle of the column at the same rate. At the top of the column a mixture of $C_7$ and $C_9$ fluoroalcohols, as shown in the table below, was fed in at a rate of 0.6 in.³/min. A heating tape wrapped around the column maintained a temperature of 60° C. at the top of the column where the exit aqueous alkaline solution was removed. The primary fluoroalcohol was removed from the bottom of the column.

| Fluoroalcohol [1] | Feed, Percent | Bottom Product, Percent |
| --- | --- | --- |
| Primary $C_7$ | 26.9 | 33.2 |
| Primary $C_9$ | 42.1 | 62.0 |
| Secondary $C_9$ | 29.9 | 3.9 |
| Other fluoroalcohols | 1.1 | 0.9 |

[1] Analysis determined by vapor phase chromatography.

The fluoroalcohol feed stream containing 29.9% of secondary fluoroalcohol was purified to one containing 3.9% of secondary alcohol. This fluoroalcohol stream may be recycled further to remove additional secondary fluoroalcohol.

*Example 2*

A solution of 1 part by volume of diethyl ether and 1 part by weight of a mixture of fluoroalcohols (given in the table below) was shaken with 5 parts (by volume) of 1% sodium hydroxide solution. The upper, aqueous, layer was separated, treated with an excess of carbon dioxide to neutralize the caustic, and saturated with sodium chloride. The turbid liquid was extracted twice with ether. Most of the ether was then distilled off to give a concentrated solution of extracted fluoroalcohols. The percentages of the primary and secondary isomers, as determined on an ether-free basis by vapor phase chromatography, and their ratios are shown in the table for both the original mixture and the extract:

| $C_n$ Fluoroalcohol | Initial Mixture [1] | | | Extract [1] | | |
| --- | --- | --- | --- | --- | --- | --- |
| | Percent Pri. | Percent Sec. | Percent Sec./ Percent Pri. | Percent Pri. | Percent Sec. | Percent Sec./ Percent Pri. |
| $C_7$ | 16.7 | 0.37 | 0.022 | 13.7 | 59.5 | 4.34 |
| $C_9$ | 35.3 | 1.4 | 0.04 | 7.7 | 13.9 | 1.81 |
| $C_{11}$ | 27.0 | 2.6 | 0.096 | 2.3 | 0.96 | 0.42 |
| $C_{13}$ | 15.3 | 1.3 | 0.085 | 1.6 | 0.33 | 0.21 |

[1] Data normalized, excluding small amounts of other fluoroalcohols.

In each case the ratio of secondary to primary alcohol is greater in the extract than in the original mixture.

The primary fluoroalcohol obtained may be subjected to further extractions to remove the last traces of secondary fluoroalcohol.

The preceding representative examples illustrate the effectiveness of the process in separating large amounts of mixtures of fluoroalcohols on a continuous basis as well as small amounts batchwise.

By the process of this invention, primary alcohols may be recovered in an essentially pure state and the secondary alcohols obtained as an enriched fraction containing only small amounts of the primary alcohols.

A further and unexpected advantage of this process is that there is no loss of fluoroalcohol during the extraction procedure.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for the separation of the secondary fluoroalcohols of the formula

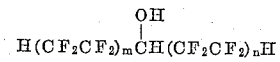

wherein $m$ and $n$ are integers from 1 to 5, from primary fluoroalcohols of the formula

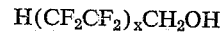

wherein $x$ is an integer of from 2 to 10, by extracting said secondary fluoroalcohols with an aqueous solution of an alkali metal hydroxide at a temperature below 75° C., said alkali metal hydroxide being used in an amount equivalent to at least a stoichiometric amount of said alkali metal hydroxide equal to that of said secondary fluoroalcohol, the concentration of said alkali metal hydroxide in said aqueous solution thereof being within the range of from 0.1 to 5%, followed by separating the resulting aqueous layer from said primary alcohol and neutralizing said aqueous layer to obtain said fluoroalcohols by acidifying to liberate secondary fluoroalcohols.

2. A process according to claim 1 wherein said secondary fluoroalcohol has the formula $$\text{H(CF}_2\text{CF}_2)_2\overset{\overset{\displaystyle \text{OH}}{|}}{\text{CH}}\text{(CF}_2\text{CF}_2)_1\text{H}$$

said primary fluoroalcohol having the formula $$\text{H(CF}_2\text{CF}_2)_3\text{CH}_2\text{OH}$$

and said alkali metal hydroxide is sodium hydroxide.

3. A process according to claim 1 wherein said secondary fluoroalcohol has the formula $$\text{H(CF}_2\text{CF}_2)_2\overset{\overset{\displaystyle \text{OH}}{|}}{\text{CH}}\text{(CF}_2\text{CF}_2)_2\text{H}$$

said primary fluoroalcohol having the formula $$\text{H(CF}_2\text{CF}_2)_4\text{CH}_2\text{OH}$$

and said alkali metal hydroxide is sodium hydroxide.

No references cited.